United States Patent [19]
Fujiwara

[11] Patent Number: 6,088,599
[45] Date of Patent: Jul. 11, 2000

[54] FIXED SUBSCRIBER UNIT

[75] Inventor: Hiroki Fujiwara, Sagamihara, Japan

[73] Assignee: Matsushita Electric Industrial Co., Ltd., Osaka, Japan

[21] Appl. No.: 09/080,289

[22] Filed: May 18, 1998

[30] Foreign Application Priority Data

May 23, 1997 [JP] Japan .................................... 9-148438

[51] Int. Cl.⁷ .................................................. H04B 1/38
[52] U.S. Cl. ........................................... 455/573; 379/413
[58] Field of Search .................................... 455/550, 572, 455/573, 574, 575, 74.1, 561, 422; 379/39, 373, 412, 413, 324, 323, 318

[56] References Cited

U.S. PATENT DOCUMENTS

| | | | |
|---|---|---|---|
| 4,984,267 | 1/1991 | Martinez | 379/413 |
| 5,469,282 | 11/1995 | Ishioka | 359/110 |
| 5,734,711 | 3/1998 | Kleffner | 379/323 |
| 5,946,617 | 8/1999 | Portaro et al. | 455/422 |

*Primary Examiner*—Daniel S. Hunter
*Assistant Examiner*—Pablo Tran
*Attorney, Agent, or Firm*—Steven, Davis, Miller & Mosher, L.L.P.

[57] ABSTRACT

A fixed subscriber unit is connected to one or a plurality of wire telephones through wire and to a radio base station, which is connected to a public network, through radio to mediate communication between a telephone, which is connected to the public network, and the wire telephone. The fixed subscriber unit includes a supply state detection unit for detecting an electric power supply state from an external power supply. The fixed subscriber unit further includes a supply control unit for detecting reduction of a voltage supplied from the external power supply and a power failure on the basis of the detected result of the supply state detection unit, and setting a voltage supplied to the wire telephone to a value smaller than a rated voltage when the reduction of the voltage or the power failure is detected. The rated voltage is a voltage supplied to the wire telephone when the voltage supplied from the external power supply is normal.

9 Claims, 2 Drawing Sheets

FIXED SUBSCRIBER UNIT

BACKGROUND OF THE INVENTION

1. Field of the Invention

The present invention relates to a fixed subscriber unit and more particularly to a fixed subscriber unit for connecting a signal line telephone (SLT), which is connected thereto through wire, to a public network through radio.

2. Description of the Related Art

A fixed subscriber unit is connected to one or a plurality of signal line telephones (SLT) through wire and to a radio base station, which is connected to a public network, through radio to mediates speech or communication between the signal line telephone and another telephone which is connected to the public network.

As shown in FIG. 1, a conventional fixed subscriber unit is connected to one or a plurality of signal line telephones (SLT) (only one signal line telephone 31 shown in FIG. 1) through wire, and is supplied with electric power from an external power supply (AC/DC) 32. The fixed subscriber unit includes an antenna 42 for transmitting and receiving radio wave from a base station which is connected to a public network, and a radio unit 37 for demodulating a received signal and modulating a transmission signal together with a TDMA/TDD processing unit and CPU 36. The TDMA/TDD processing unit and CPU 36 controls the radio unit 37, a ringer driving circuit 40 and other circuits so that outgoing operation, incoming operation and communication are performed through radio between the signal line telephone 31 and another telephone which is connected to the public network. A speech circuit 38 is provided between the TDMA/TDD processing unit and CPU 36 and the signal line telephone 31. The speech circuit 38 converts two telephone lines for connecting the speech circuit 38 to the signal line telephone 31 into two transmission lines and two receiving lines (four lines in total) for connecting the speech circuit 38 to the radio unit 37, and controls formation of a DC loop between the signal line telephone 31 and the speech circuit 38 during the communication. A hooking detection circuit 43 for detecting hooking information from the signal line telephone 31 is provided between the speech circuit 38 and the signal line telephone 31. The ringer driving circuit 40 produces a ringing signal for ringing a ringer of the signal line telephone 31. A battery/charging circuit 41 connected to the external power supply (AC/DC) 32 supplies electric power to an electric power supply circuit 34 upon stoppage of supply of AC electric power such as power failure. The electric power supply circuit 34 supplies a DC current to the telephone lines for connecting the speech circuit 38 to the signal line telephone 31. First and second constant current circuits 391 and 392 provided in the telephone lines for connection of the speech circuit 38 and the signal line telephone 31 control the current supplied to the signal line telephone 31 to a constant current during the off-hook.

Operation of the fixed subscriber unit is now described. When there is an incoming call from an opposite telephone through the radio base station, the TDMA/TDD processing unit and CPU 36 which has received incoming information from the radio unit 37 controls the ringer driving circuit 40 to send a ringing signal to the signal line telephone (SLT) 31. When the signal line telephone 31 is off-hooked, the off-hook information is sent from the hooking detection circuit 43 to the TDMA/TDD processing unit and CPU 36. When the TDMA/TDD processing unit and CPU 36 receives the off-hook information, the TDMA/TDD processing unit and CPU 36 controls the speech circuit 38 to connect the signal line telephone 31 to the opposite telephone through the antenna 42, the radio unit 37 and the speech circuit 38. The electric power supply circuit 34 receives electric power from the external power supply (AC/DC) 32 to supply a voltage of 48 V to the signal line telephone 31 during the off-hook and to supply a DC current of 120 mA to the signal line telephone 31 during the communication.

As described above, the fixed subscriber unit can mediate communication between the single or the plurality of signal line telephones connected thereto through wire and the other telephone connected to the public network through radio.

In the conventional fixed subscriber unit, however, the voltage of 48 V is always supplied to the signal line telephone 31 and the current of 120 mA is also supplied thereto during the communication. Further, a voltage of 35 Vrms or more is supplied to the signal line telephone 31 during ringing of the ringer. Accordingly, it is necessary to supply such electric power to the signal line telephone 31 from the battery/charging circuit 41 during a power failure. Therefore, there is a problem that it is necessary to increase the number of battery cells and it is indispensable that the cost, weight and size of the fixed subscriber unit are increased due to the increased number of battery cells when a long-time operation of the fixed subscriber unit is to be ensured by the battery/charging circuit 41.

SUMMARY OF THE INVENTION

It is an object of the present invention to provide a fixed subscriber unit capable of lightening a burden of a backup battery by reducing power consumption during reduction of an externally supplied voltage and during a power failure.

A fixed subscriber unit according to the present invention comprises: supply state detection means for detecting an electric power supply state from an external power supply; and control means for limiting a voltage supplied to a signal line telephone (wire telephone) connected to the fixed subscriber unit through wire, a ringer operation time for calling out the wire telephone or a ringer operation voltage for performing a calling-out operation of the wire telephone on the basis of the detected result of the electric power supply state when the voltage from the external power supply is reduced or a power failure occurs.

Accordingly, since the power consumption can be reduced when the voltage from the external power supply is reduced or supply of the voltage from the external power supply is stopped, the backup battery can be kept long and the battery can be made small in size and light in weight.

A first fixed subscriber unit according to the present invention is connected to one or a plurality of wire telephones through wire and to a radio base station, which is connected to a public network, through radio to mediate communication between a telephone, which is connected to the public network, and the wire telephone, and comprises: supply state detection means for detecting an electric power supply state from an external power supply; and supply control means for detecting reduction of a voltage supplied from the external power supply and a power failure on the basis of the detected result of the supply state detection means and setting a voltage supplied to the wire telephone to a value smaller than a rated voltage when the reduction of the voltage or the power failure is detected, the rated voltage being a voltage supplied to the wire telephone when the voltage supplied from the external power supply is normal.

A second fixed subscriber unit according to the present invention is connected to one or a plurality of wire telephones through wire and to a radio base station, which is connected to a public network, through radio to mediate communication between a telephone, which is connected to the public network, and the signal line wire telephone, and comprises: supply state detection means for detecting an electric power supply state from an external power supply; and ringer operation time control means for detecting reduction of a voltage supplied from the external power supply and a power failure on the basis of the detected result of the supply state detection means and setting a ringer operation time for calling out the wire telephone to a time shorter than a predetermined operation time when the reduction of the voltage or the power failure is detected, the predetermined operation time being a ringer operation time for calling out the wire telephone when the voltage supplied from the external power supply is normal.

A third fixed subscriber unit according to the present invention is connected to one or a plurality of wire telephones through wire and to a radio base station, which is connected to a public network, through radio to mediate communication between a telephone, which is connected to the public network, and the wire telephone, and comprises: supply state detection means for detecting an electric power supply state from an external power supply; and ringer operation voltage control means for detecting reduction of a voltage supplied from the external power supply and a power failure on the basis of the detected result of the supply state detection means and setting a ringer operation voltage for calling out the wire telephone to a value smaller than a rated voltage when the reduction of the voltage or the power failure is detected, the rated voltage being a ringer operation voltage for calling out the wire telephone when the voltage supplied from the external power supply is normal.

DESCRIPTION OF THE PREFERRED EMBODIMENTS (First Embodiment)

Figure 1:
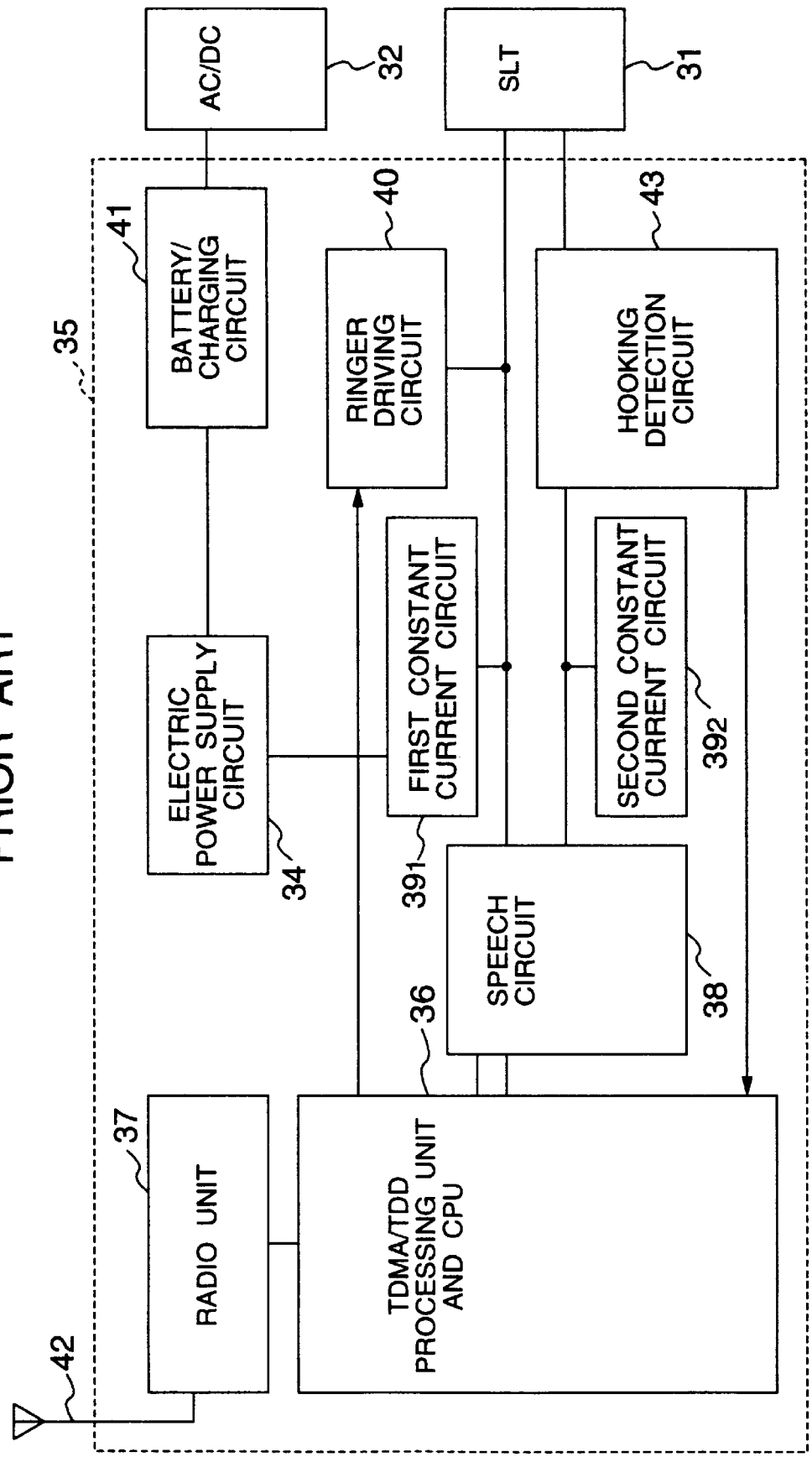
FIG. 1 is a block diagram schematically illustrating a conventional fixed subscriber unit.
Figure 2:
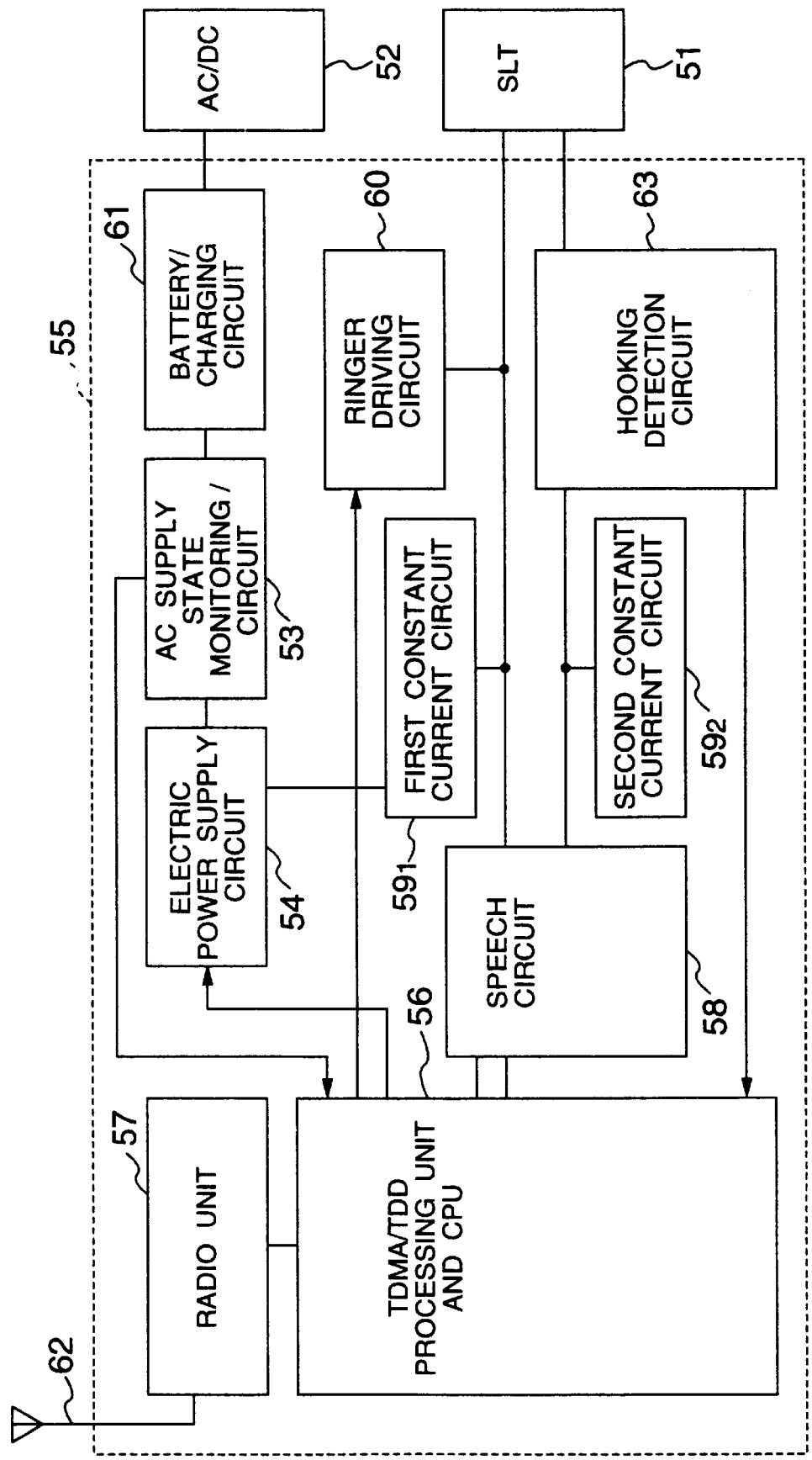
FIG. 2 is a block diagram schematically illustrating a fixed subscriber unit according to a first embodiment of the present invention.

Referring now to FIG. 2, a fixed subscriber unit according to a first embodiment of the present invention has the same configuration as the conventional fixed subscriber unit shown in FIG. 1, but is different from the conventional fixed subscriber unit in that an AC supply state monitoring circuit 53 is provided between a battery/charging circuit 61 and an electric power supply circuit 54 to monitor a voltage from an external power supply (AC/DC) 52 and to detect AC supply/ AC failure (AC supply state) to supply the detected result to a TDMA/TDD processing unit and CPU 56.

More particularly, in the fixed subscriber unit according to the present embodiment, a voltage from the external power supply (AC/DC) 52 is monitored by the AC supply state monitoring circuit 53 to detect the AC supply/AC failure (AC supply state). The detected result is supplied from the AC supply state monitoring circuit 53 to the TDMA/TDD processing unit and CPU 56. When the AC supply from the external power supply (AC/DC) 52 is normal, the TDMA/ TDD processing unit and CPU 56 sets electric power produced by the electric power supply circuit 54 so that a DC rated voltage (48 V) and a DC rated current (120 mA) are supplied to a signal line telephone (SLT) 51. On the other hand, when the voltage from the external power supply (AC/DC) 52 is reduced, the TDMA/TDD processing unit and CPU 56 determines the DC voltage and the DC current supplied from the electric power supply circuit 54 to the signal line telephone 51 to a range of 24 V to 48 V and a range of 20 mA to 120 mA, respectively, in accordance with the reduced degree of the voltage, and sets the electric power produced by the electric power supply circuit 54. Further, during a power failure, the TDMA/TDD processing unit and CPU 56 sets the electric power produced by the electric power supply circuit 54 so that a DC voltage (24 V) in a most reduced power mode and a DC current (20 mA) in a most reduced power mode are supplied to the signal line telephone 51.

As described above, in the fixed subscriber unit according to the present embodiment, since the supply of electric power to the signal line telephone 51 can be controlled in accordance with the AC supply state to thereby minimize the power consumption during reduction of the voltage and during the power failure, a backup time by the battery or the like can be prolonged. Further, since the number of cells of the backup secondary battery can be reduced, the cost, weight and size of the fixed subscriber unit can be reduced.

An antenna 62, a radio unit 57, a speech circuit 58, first and second constant current circuits 591 and 592, a ringer driving circuit 60, a hooking detection circuit 63 and a battery charging circuit 61 are the same as the antenna 42, the radio unit 37, the speech circuit 38, the first and second constant current circuits 391 and 392, the ringer driving circuit 40, the hooking detection circuit 43 and the battery charging circuit 41 shown in FIG. 1, respectively, and accordingly description thereof is omitted.

(Second Embodiment)

A fixed subscriber unit according to a second embodiment of the present invention has the same configuration as the fixed subscriber unit according to the first embodiment mentioned above, but is different from the fixed subscriber unit according to the first embodiment in that electric power consumed for calling out the signal line telephone (SLT) 51 is controlled in accordance with the AC supply state.

More particularly, in the fixed subscriber unit according to the present embodiment, the voltage from the external power supply (AC/DC) 52 is monitored by the AC supply state monitoring circuit 53 to thereby detect the AC supply/ AC failure (AC supply state). The detected result is supplied from the AC supply state monitoring circuit 53 to the TDMA/TDD processing unit and CPU 56. When the AC supply from the external power supply (AC/DC) 52 is normal, the TDMA/TDD processing unit and CPU 56 sets an operation time of the ringer driving circuit 60 in incoming operation to infinity. On the other hand, when the voltage from the external power supply (AC/DC) 52 is reduced, the TDMA/TDD processing unit and CPU 56 sets a supply time of the ringer driving signal sent from the ringer driving circuit 60 to the signal line telephone 51 in the incoming operation to a range of 0 second to infinity in accordance with the reduced degree of the voltage. Further, during the power failure, the TDMA/TDD processing unit and CPU 56 sets the supply time of the ringer driving signal to 0 second (most reduced power mode). At this time, only calling or origination of a call is controlled for the signal line telephone 51.

As described above, in the fixed subscriber unit according to the present embodiment, since the power consumption required for the ringing operation can be controlled in accordance with the AC supply state to thereby minimize the power consumption during reduction of the voltage and during the power failure, the backup time of the battery or the like can be prolonged. Further, since the number of cells of the backup secondary battery can be reduced, the cost, weight and size of the fixed subscriber unit can be reduced.

(Other Embodiments)

In the fixed subscriber unit according to the second embodiment, the operation time of the ringer driving circuit 60 is controlled in order to control the electric power consumed for calling out the signal line telephone 51 in accordance with the AC supply state, while an output voltage of the ringer driving circuit 60 may be controlled as follows. That is, when the AC supply from the external power supply (AC/DC) 52 is normal, the TDMA/TDD processing unit and CPU 56 sets the output voltage of the ringer driving circuit 60 in the incoming operation to a rated value. On the other hand, when the voltage from the external power supply (AC/DC) 52 is reduced, the TDMA/TDD processing unit and CPU 56 sets the output voltage of the ringer driving circuit 60 in the incoming operation to a range of a minimum voltage (most reduced power mode), by which the signal line telephone 51 can be rung, to the rated value in accordance with the reduced degree of the voltage. Further, during the power failure, the TDMA/TDD processing unit and CPU 56 sets the output voltage of the ringer driving circuit 60 to the minimum voltage (most reduced power mode).

In addition, the control of supply of electric power to the signal line telephone (SLT) 51 in the fixed subscriber unit according to the first embodiment and the control of the operation time of the ringer driving circuit 60 in the fixed subscriber unit according to the second embodiment of the present invention (or the control of the output voltage of the ringer driving circuit 60) may be used in combination.

What is claimed is:

1. A fixed subscriber unit connected to one or a plurality of wire telephones through wire and to a radio base station, which is connected to a public network, through radio to mediate communication between a telephone, which is connected to said public network, and said wire telephone, comprising:

supply state detection means for detecting an electric power supply state from an external power supply; and supply control means for detecting reduction of a voltage supplied from said external power supply and a power failure on the basis of the detected result of said supply state detection means, and setting a voltage supplied to said wire telephone to a value smaller than a rated voltage when said reduction of said voltage or said power failure is detected, said rated voltage being a voltage supplied to said wire telephone when said voltage supplied from said external power supply is normal.

2. A fixed subscriber unit according to claim 1, wherein said supply control means sets said voltage supplied to said wire telephone to a range of 24 V to 48 V in accordance with reduced degree of said voltage when said reduction of said voltage is detected.

3. A fixed subscriber unit according to claim 1, wherein said supply control means sets said voltage supplied to said wire telephone to a minimum supply voltage value when said power failure is detected.

4. A fixed subscriber unit connected to one or a plurality of wire telephones through wire and to a radio base station, which is connected to a public network, through radio to mediate communication between a telephone, which is connected to said public network, and said wire telephone, comprising:

supply state detection means for detecting an electric power supply state from an external power supply; and ringer operation time control means for detecting reduction of a voltage supplied from said external power supply and a power failure on the basis of the detected result of said supply state detection means, and setting a ringer operation time for calling out said wire telephone to a time shorter than a predetermined operation time when said reduction of said voltage or said power failure is detected, said predetermined operation time being a ringer operation time for calling out said wire telephone when said voltage supplied from said external power supply is normal.

5. A fixed subscriber unit according to claim 4, wherein said ringer operation time control means sets said ringer operation time in accordance with the reduced degree of said voltage when the reduction of said voltage is detected.

6. A fixed subscriber unit according to claim 4, wherein said ringer operation time control means sets said ringer operation time to zero when the power failure is detected.

7. A fixed subscriber unit connected to one or a plurality of wire telephones through wire and to a radio base station, which is connected to a public network, through radio to mediate communication between a telephone, which is connected to said public network, and said wire telephone, comprising:

supply state detection means for detecting an electric power supply state from an external power supply; and ringer operation voltage control means for detecting reduction of a voltage supplied from said external power supply and a power failure on the basis of the detected result of said supply state detection means, and setting a ringer operation voltage for calling out said wire telephone to a value smaller than a rated voltage when said reduction of said voltage or said power failure is detected, said rated voltage being a ringer operation voltage for calling out said wire telephone when said voltage supplied from said external power supply is normal.

8. A fixed subscriber unit according to claim 7, wherein said ringer operation voltage control means sets said ringer operation voltage in accordance with the reduced degree of said voltage when the reduction of said voltage is detected.

9. A fixed subscriber unit according to claim 8, wherein said ringer operation voltage control means sets said ringer operation voltage to a minimum ringer operation voltage value, by which said wire telephone can be rung, when the power failure is detected.

* * * * *